United States Patent [19]

Hammer et al.

[11] Patent Number: 4,529,634
[45] Date of Patent: Jul. 16, 1985

[54] TUBULAR FOOD CASING

[75] Inventors: Klaus-Dieter Hammer, Mainz-Mombach; Hermann Winter, Wiesbaden-Biebrich, both of Fed. Rep. of Germany

[73] Assignee: Hoeschst Aktiengesellschaft, Frankfurt am Main, Fed. Rep. of Germany

[21] Appl. No.: 514,657

[22] Filed: Jul. 18, 1983

[30] Foreign Application Priority Data

Jul. 27, 1982 [DE] Fed. Rep. of Germany ....... 3227920

[51] Int. Cl.³ .............................................. B05D 7/22
[52] U.S. Cl. ................... 428/36; 138/118.1; 426/105
[58] Field of Search ....... 138/118.1; 428/36; 426/105

*Primary Examiner*—John E. Kittle
*Assistant Examiner*—James J. Seidleck

*Attorney, Agent, or Firm*—Schwartz, Jeffery, Schwaab, Mack, Blumenthal & Evans

[57] ABSTRACT

Disclosed is a tubular food casing based on cellulose, preferably fiber-reinforced cellulose, which is permeable to gas, water-vapor and smoke and which includes a synthetic polymeric coating on its outside surface comprising an elastic, non-adhesive copolymer based on hydrophilic vinyl monomers, particularly a copolymer based on unsaturated carboxylic acids and the esters thereof and, optionally, a wax, particularly a wax having functional groups. This coating functions to improve the casing's resistance to degradation by cellulases and other cellulolytic enzymes. Additionally, the invention describes a process for manufacturing the food casing, in which the cellulosic material, in the gel state, is coated with an aqueous dispersion and also the use of the casing in the production of long-keeping sausages having a mold overlay on their outer surfaces.

20 Claims, No Drawings

TUBULAR FOOD CASING

BACKGROUND OF THE INVENTION

The present invention relates to a gas, water-vapor and smoke-permeable tubular food casing, in particular a sausage casing, based on a cellulose, preferably a fiber-reinforced cellulose, which is a suitable substrate for a mold overlay, i.e. a culture of mold fungi conducive to the ripening process of sausages. The casing is provided with a synthetic polymeric coating to improve its resistance to degradation of the cellulose by cellulases or other cellulolytic enzymes. The invention also relates to a process for manufacturing this casing and to the use thereof in the production of dry sausages, long-keeping sausages and uncooked sausages.

As is known, tubular food casings comprising fiber-reinforced cellulose are used both for packaging processed meat products, for example, sausage emulsions and poultry slices, and dairy products, for example, cheese in the form of rolls. These food casings, which are also called fibrous casings, usually comprise a web of fiber material, for example a paper web, shaped into a tubing and provided with a cellulosic coating which is particularly produced by applying viscose to the fiber material and then precipitating and regenerating the viscose into cellulose hydrate.

The casings used for packaging various types of sausage products must have different properties. In the case of sausages which are known as dry sausages, long-keeping sausages or uncooked sausages, for example, salami and cervelat sausage, the preservation treatment comprises drying and, if appropriate, smoking of the sausages and, therefore, casings are required, which are permeable to gases, water-vapor and smoke.

High-quality varieties of these dry, long-keeping and uncooked sausages are known which are produced according to the natural ripening process and are covered with a mold overlay on the outside of the cellulosic casing. In this process, the sausages are preserved by air-drying for a prolonged period of time, the usual storage times being two or three months or even longer. For producing sausages by the natural ripening process, it is therefore necessary to have a sausage casing which has a particularly high permeability to water-vapor and shows a good breathing effect. However, the long storage times required in the natural ripening process present certain problems. For example, the mold overlay produces cellulases and other cellulolytic enzymes, which disintegrate the cellulosic casing with increasing storage time. As a consequence, the casing becomes brittle and can no longer be peeled from the sausage meat without breaking, particularly at the end of the storage time.

To solve this problem, U.S. Pat. No. 3,935,320 describes a cellulosic casing provided with a closely adhering coating of a cured cationic resin, for example, a reaction product of epichlorohydrin and a polyamide, which is necessarily present on both sides of the casing. However, even these casings, which are resin-coated on both sides, tend to become embrittled. Particularly, there is a risk that cracks will occur in the resin coatings, when these casings are gathered into sticks, i.e. into shirred tubings, which are used on automatic filling machines for stuffing with sausage meat, for example. Through these cracks, the cellulolytic enzymes of the mold fungi enter into contact with the cellulose, which is thus gradually disintegrated.

SUMMARY OF THE INVENTION

It is therefore an object of the present invention to provide a gas, water-vapor and smoke-permeable tubular food casing based on cellulose, which is a suitable substrate for a mold overlay and which exhibits a permanent resistance to degradation of the cellulosic material by cellulases and other cellulolytic, enzymatic compounds produced by mold fungi.

It is a further object of the invention to produce a casing as described above which exhibits degradation resistance even after the action of comparatively high mechanical stresses on the casing surface, particularly mechanical gathering of the casing into shirred sticks for use on automatic stuffing machines.

A still further object of the present invention is the production of a tubular food casing having a mold overlay on the outside tubular surfaces which allows storage of the contained foodstuffs over a period of several months prior to being consumed.

In accordance with one object of the present invention, there has been provided a gas, water-vapor and smoke permeable tubular food casing, comprising a cellulose casing and a synthetic polymeric coating applied to the outside surface of the casing of a copolymer comprising hydrophilic vinylmonomers of the formula $CH_2=CR^1-X$, wherein $-R^1$ is $-H$ or $-CH_3$ and $-X$ is $-OCOR^2$ or $-CO_2R^2$, $-R^2$ being an alkyl group with 2 to 20 carbon atoms, preferably 2 to 10 carbon atoms. A copolymer with increased adhesion to the casing further comprises a hydrophilic vinylmonomer of the formula $CH_2=CR^1-CO_2H$.

In a preferred embodiment the copolymer comprises an acrylic acid or methacrylic acid and an acrylate, methacrylate or vinyl alcohol ester having a predominate ester proportion. And in an even more preferred embodiment, the copolymer comprises acrylic acid and at least one acrylate or methacrylic acid and at least one methacrylate having a proportion of free acid from about 0.1 to 10% by weight, relative to the total weight of the copolymer and wherein the alcohol units of the esters have from about 2 to 10 carbon atoms.

In a further embodiment of the invention, the copolymeric outside coating includes a wax, preferably a chemically-modified montan wax.

In accordance with another object of the present invention, there has been provided a process for manufacturing the casing as defined above, comprising the steps of coating the cellulose casing after precipitating and regenerating steps, with a coating liquid comprising an aqueous dispersion of a polymer having a concentration of at least about 0.8% by weight and less than about 5% by weight relative to the total weight of the dispersion, and drying the coated casing at elevated temperatures.

In accordance with yet another object of the present invention, there has been provided a use of the casing as defined above as a sausage casing for the production of dry, long-keeping and uncooked sausages, which have a mold overlay on the outside of the casing and are stored for at least 2 months for ripening and air drying purposes.

Further objects, features and advantages of the present invention will become apparent from the description of preferred embodiments which follows.

A tubular food casing based on a preferably fiber-reinforced cellulose and provided with a synthetic polymeric coating as herein described, has previously been described in U.S. Pat. No. 4,287,217. However, this known casing has a film coating on its inside surface, which is impermeable to water and water-vapor and for that reason alone, the casing is completely unsuitable for dry, long-keeping or uncooked sausages, since moisture cannot escape from the sausage meat and it is impossible to smoke the sausage meat contained in this casing. Furthermore, the synthetic polymeric coating on the outside of this sausage casing serves to reduce the sensitivity to shock of the casing and is intended to prevent an undesirable tendency of extensive tearing and other propagation, upon cutting of the sausages. Thus, U.S. Pat. No. 4,287,217 cannot solve the problem of disintegration of cellulose by cellulolytic enzymes which is the specific object of the present invention. In particular, it could not be anticipated that mold fungi would adhere well to a cellulosic casing provided with a synthetic polymeric coating on its outside, much less that the mold fungi would grow on this material, especially since synthetic polymers often have a fungicide action. It is therefore surprising that it is actually possible to cultivate a mold overlay on this material.

DETAILED DESCRIPTION OF PREFERRED EMBODIMENTS

According to the present invention, the copolymer is applied as a coating to the outside surface of the tubular food casing, in an amount such that the properties of the casing are not adversely influenced. In particular, good permeability to smoke, water-vapor and gas of the cellulosic material should remain substantially unchanged and, in addition, the growth of the cultures of mold fungi on the outside of the casing should not be inhibited by the application of the copolymer.

Surprisingly, the desired result is achieved with a comparatively very small amount of copolymer, corresponding to a weight per unit area of only about 80 mg to less than about 500 mg of copolymer per square meter of casing material, preferably from about 150 to 400 mg/m$^2$.

Usually, the coating is applied during the course of casing manufacture, preferably before drying, by passing the casings which are in the gel state through baths, commonly referred to as coating baths, which contain the copolymer in an aqueous dispersion. It is, however, also possible to produce the coating by brushing or spraying an aqueous dispersion onto the casings which are subsequently dried.

The tubular casings comprising the fiber-reinforced cellulosic tubings can be manufactured according to known processes, for example, from viscose-coated paper. The casings are treated with the aqueous dispersion while in the gel state, i.e. after precipitation and regeneration of the viscose and prior to drying. For this purpose, the casings are, in particular, passed through the coating bath and then dried in the inflated state at elevated temperatures, usually between about 90° and 140° C., thus forming cellulose hydrate and evaporating the liquid constituents in the coating and support material. Subsequently, the casings are, if appropriate, sprayed with water to obtain a moisture content of more than about 7%, a level which is necessary for further processing.

According to this procedure, the concentration of the copolymer in the aqueous dispersion is in the range from about 0.8 to less than about 5% by weight, preferably in the range from about 1.5 to 4% by weight of copolymer, relative to the total amount of dispersion.

Suitable elastic, non-adhesive, random copolymers based on hydrophilic vinyl monomers are preferred copolymers. The monomers preferably comprise acrylic acid or methacrylic acid and acrylates, methacrylates or vinyl alcohol esters, wherein the ester proportion quantitatively predominates. More preferably, the copolymer comprises acrylic acid and at least one acrylate or methacrylic acid and at least one methacrylate having a proportion of free acid from about 0.1 to 10% by weight, preferably not more than 5% by weight, and more preferably not more than 2% by weight, relative to the total weight of the copolymer. Particularly advantageous compositions comprise acrylic acid, butyl acrylate and, optionally, ethyl acrylate, in which the proportion of ethyl acrylate predominates, with the proportions of free acid preferably ranging from about 0.5 to 3% by weight, particularly from about 1 to 2% by weight, relative to the total weight of the polymer. Particularly advantageous are acrylates and methacrylates which have an alcohol component comprising from about 2 to 10, preferably from about 2 to 5 carbon atoms, such as, for example, ethyl acrylate, propyl acrylate, butyl acrylate, isopropyl acrylate, cyclopentyl acrylate, ethyl methacrylate, propyl methacrylate, isopropyl methacrylate, butyl methacrylate and isobutyl methacrylate.

In a preferred embodiment, the synthetic polymeric coating includes a wax. The wax used is, for example, a vegetable wax, such as candelilla, carnauba or montan wax; an animal wax, such as bees wax; a mineral wax, such as polyolefine wax comprising n-paraffins and iso-paraffins or a synthetic wax, for example, comprising oxazoline.

Particularly suitable waxes are those having functional groups in which the main constituent comprises a mixture of esters of linear aliphatic alcohols with linear higher-molecular weight fatty acids, the chain-lengths of which preferably range between about 18 and 34 carbon atoms. The alcohol component mainly comprises a monohydric alcohol; polyhydric alcohols having free OH groups are present only in minor amounts. The linear, higher-molecular weight fatty acids also include long-chain hydroxycarboxylic acids and dicarboxylic acids. Waxes of this kind particularly comprise candelilla wax, carnauba wax, bees wax and montan wax.

A particularly suitable wax having the above-described functional groups is a chemically modified montan wax which is, for example, commercially available as as so-called "acid wax" or "ester wax" and is also referred to as a "modified montan wax". Chemically modified montan wax is obtained by oxidizing crude and deresinated montan wax, for example, with chromosulfuric acid. In this bleaching process, the blackish-brown resin and asphalt substances contained in the wax are degraded and removed. The resin-wax alcohol-esters are decomposed and the liberated wax alcohols are oxidized into wax acids. The hydroxy acids and diols present are then oxidized into dicarboxylic acids. To a minor degree, even the wax esters are hydrolytically decomposed and converted into wax acids. All the acid groups of this "acid wax" or "montan wax acid" are then esterified with monohydric or polyhydric alcohols, for example, with ethylene glycol and 1,3-butylene glycol (1:1) (KPS Type, manufactured by HOECHST AG) to produce an "ester wax" or "esterified montan wax acid", respectively. According to the present invention, the chemically modified montan wax can be used as "acid wax" or as "ester wax". The original wax structure comprising long-chain aliphatic compounds is substantially maintained in the chemically modified montan wax.

Waxes having functional groups, especially chemically modified montan wax, produce a significant improvement in the processability of the cellulosic food casing without impairing the properties required of the casing, such as, for example, its permeability. The wax addition has the additional advantage that it prevents any adhesion of the casing during storage and transport. The effect of the waxes could be ascribed to the fact that the ester units, by their functional groups, possibly add on the cellulose chains, which may lead to a formation of hydrogen bridges between the functional groups of the ester units and the cellulose.

The proportion of the wax component in the coating liquid and in the final coating is very small, compared with the amount of copolymer used. Usually the wax proportion ranges between about 0.3 and 5% by weight, particularly between about 0.8 and 3% by weight, relative to the weight of the entire synthetic polymeric coating on the outside of the casing.

Usually, the wax is applied to the outside surface of the coating, together with the copolymer. For this purpose, from about 0.3 to 5% by weight, particularly from about 0.8 to 3% by weight of emulsified wax, relative to the total weight of the dispersed synthetic polymeric portions, are added to the dispersion.

It is actually not necessary to apply a coating to the inside surface of the food casing. In a preferred embodiment, a synthetic polymeric coating is, however, present, which is permeable to smoke, gas and water-vapor and which facilitates peeling of the sausage casing from the sausage meat, in particular in long-keeping sausages.

A particularly suitable interior coating comprises an originally water-soluble cationic resin, which has been cured and rendered insoluble in water by the action of heat, particularly a cationic resin on a basis of casein-formaldehyde, urea-formaldehyde or melamine-formaldehyde or of a condensation product of an aliphatic polyamine or polyamide or of a polyamine-polyamide with bifunctional halohydrins or the derivatives thereof, such as epichlorohydrin, or mixtures of these resins. These resins are, for example, disclosed in U.S. Pat. Nos. 2,616,874; 2,796,362; 2,345,543; 2,573,956; 2,926,154 and 3,378,379.

A preferred cationic resin comprises the condensation product on a basis of a polyamine-polyamide and epichlorohydrin. Polyamine-polyamides are condensation products of a saturated, aliphatic, dibasic acid which has from about 3 to 8 carbon atoms in the molecule, with a polyamine which has at least one secondary and two primary amino groups.

The cationic resin which is still in the uncured, water-soluble state is applied to the inside surface of the casing from an aqueous solution, as is known in the art. During application, the casing is in the gel state or in the dried and optionally re-moistened state. The aqueous solution normally contains from about 0.3 to 2.5% by weight, particularly from about 0.5 to 1.2% by weight of pre-condensate, relative to the total solution. The amount of water-insoluble cationic resin applied corresponds to a weight per unit area from about 40 to 120 mg/m$^2$, particularly from about 50 to 80 mg/m$^2$.

The cellulose hydrate casings, provided on their outer surfaces with the synthetic polymeric coating of the present invention, exhibit a permanent resistance to degradation by enzymatic compounds, which are generated by mold fungi, even if these casings have been mechanically shirred. Shirred tubings are used in the production of sausages on automatic stuffing machines, after soaking in water of, if pre-moistened casings are used, without prior soaking in water. The shirred tubings particularly exhibit a permanent resistance to cellulases even in those places which have been subjected to very high mechanical stresses resulting from the attack of the shirring tools.

The casings treated according to the present invention additionally show a good quality, in view of their permeability to smoke, water-vapor and gases so that especially those sausages smoked in these casings are found to be excellent products. Furthermore, the growth of cultures of mold fungi on the outsides of the casings is in no way adversely influenced by the resins of the invention.

The examples which follow are intended to further illustrate the advantages of the present invention. The cultures of mold fungi used in the examples comprise: penicillium nalgiovensis, penicillium expansum and debaryomyces kloeckeri. The resin coating applied to the inside of the tubing comprises a polyamine-polyamide/epichlorohydrin precondensate (®Resamine HW601, manufactured by HOECHST AG), which is used in the form of an aqueous solution having a concentration ranging from about 0.8 to 1.2% by weight; the aqueous solution is applied in an amount from about 40 to 120 mg/m$^2$.

The moisture contents of the tubular casings are determined by three different methods, which yield identical results, when simultaneously employed. These methods include: titration according to Karl Fischer, measurement with the aid of a hygrometer "Aqua-Boy" ZP II, manufactured by Mundinger GmbH, and gravimetric determination after drying for three hours at 105° C.

The amount of synthetic polymeric coating applied is gravimetrically determined according to the difference method. For this purpose, the coating is detached by means of an organic solvent, for example, ethyl acetate, toluene, tetrahydrofuran or dimethyl formamide.

The following storage conditions for uncooked sausages are used in the examples: temperature from 12° to 14° C., relative humidity from 70 to 85%.

Air-drying of the sausages is conducted over a period of several months and results in a weight loss between about 25 and 30%, due to the evaporation of water from the sausage meat. Unless otherwise indicated, all percentages are by weight.

EXAMPLE 1

A casing with a fiber-paper insert (60 mm diameter) is prepared by applying viscose to a fiber-paper tubing, followed by precipitation and regeneration. While still in the gel state, i.e. before entering into the drier, the tubing is passed through an impregnating bath containing an aqueous solution of the following composition:
 6.0% by volume of a 50% strength dispersion of a random copolymer comprising 1% of acrylic acid and 99% of an isomeric butyl acrylate (®Acronal 500 D, manufactured by BASF),
 10.0% by volume of glycerol, 0.46% by volume of a 19.4% strength wax emulsion of a montan ester wax (KPS wax, manufactured by HOECHST AG).

An impregnating solution comprising the above-mentioned precondensate is introduced into the interior of the tubing. The tubing is then dried in the inflated state. According to the procedure, the dispersing agent is removed from the outside of the tubing and a synthetic polymeric coating is formed. At the same time, the precondensate on the inside surface of the tubing is cured and forms a water-insoluble interior coating. In order to adjust the moisture content of the support material to a value ranging from about 16 to 18%, the tubing is sprayed with water and is, subsequently or simultaneously, shirred into a stick using a conventional shirring apparatus.

The synthetic polymeric coating formed on the outside surface of the casing has a weight per unit area of 160 mg/m$^2$ and the cured-resin coating on its inside surface has a weight per unit area of 60 mg/m$^2$.

The casing prepared in this manner is filled with sausage meat of an extra-quality salami type and coated with a mold overlay. The sausage is then stored for three months under the above-mentioned conditions. After storage, an attack of cellulases is not observed. The casing can easily be peeled from the sausage meat, without tearing or breaking.

EXAMPLE 2

A fiber tubing is provided with viscose and, after passing through precipitating and regenerating baths, the tubing, which is in the gel state, is passed through an impregnating bath positioned before the drier entry and containing an aqueous solution of the following composition:

6.0% by volume of a 50% strength dispersion of an acrylate copolymer having the following composition:
2% of acrylic acid,
90% of ethyl acrylate and
8% of butyl acrylate (®Acronal 200D, manufactured by BASF),
10.0% by volume of glycerol and
0.1% by volume of a 20% strength montan wax emulsion (KPS wax, manufactured by HOECHST AG).

The interior of the tubing is filled with a 1.1% strength impregnating solution comprising the above-mentioned pre-condensate. The tubing is then dried at temperatures ranging between about 90° and 140° C. and is sprayed with water to adjust its moisture content to about 8 to 10%.

The synthetic polymeric coating on the outside surface of the casing thus produced has a weight per unit area of 150 mg/m$^2$ and the cured-resin coating on its inside surface has a weight per unit area of 80 mg/m$^2$.

The casing is stuffed with sausage meat of the Hungarian extra-quality salami type and its surface is coated with a mold overlay. After storing the sausage for three months, the casing can be peeled from the sausage meat without breaking.

What is claimed is:

1. A gas, water-vapor and smoke permeable tubular food casing, consisting essentially of:
   a cellulose casing; and
   a synthetic polymeric coating applied to the outside surface of said casing of a copolymer comprising hydrophilic vinylmonomers of the formula $CH_2=CR^1-X$, wherein $-R^1$ is $-H$ or $-CH_3$ and $-X$ is $-OCOR^2$ or $-CO_2R^2$, $-R^2$ being an alkyl group with 2 to 20 carbon atoms, and optionally an additional hydrophilic vinylmonomer of the formula $CH_2=CR^1-CO_2H$, wherein said copolymeric outside coating has a weight per unit area from about 0.08 g/m$^2$ to less than 0.5 g/m$^2$.

2. A casing as defined in claim 1, wherein said copolymer comprises an acrylate, methacrylate or vinyl alcohol ester and an acrylic acid or methacrylic acid having a predominate ester proportion.

3. A casing as defined in claim 2, wherein said copolymer comprises acrylic acid and at least one acrylate or methacrylic acid and at least one methacrylate having a proportion of free acid from about 0.1 to 10% by weight, relative to the total weight of the copolymer and wherein the alcohol units of the esters have from about 2 to 10 carbon atoms.

4. A casing as defined in claim 2, wherein said free acid comprises not more than about 5% by weight of said copolymer.

5. A casing as defined in claim 4, wherein said free acid comprises not more than about 2% by weight of said copolymer.

6. A casing as defined in claim 3, wherein said alcohol units of said esters have from about 2 to 5 carbon atoms.

7. A casing as defined in claim 3, wherein said copolymer comprises acrylic acid and butyl acrylate.

8. A casing as defined in claim 7, wherein said copolymer further comprises ethyl acrylate and wherein said free acid ranges from about 0.5 to 3% by weight relative to the total weight of the polymer.

9. A casing as defined in claim 8, wherein said free acid ranges from about 1 to 2% by weight.

10. A casing as defined in claim 1, wherein said cellulose casing comprises a fiber-reinforced cellulose casing.

11. A casing as defined in claim 1, further comprises a gas, water-vapor and smoke permeable coating on the inside surface of said casing, said coating comprising a cured cationic polymeric resin.

12. A casing as defined in claim 11, wherein said coating comprises a polyamine-polyamide/epichlorohydrin resin.

13. A casing as defined in claim 1, wherein said coating has a weight per unit area from about 0.15 to 0.4 g/m$^2$.

14. A casing as defined in claim 1, wherein said copolymeric outside coating further comprises a wax in an amount from about 0.3 to 5% by weight relative to the total weight of said coating.

15. A casing as defined in claim 14, wherein said wax comprises from about 0.8 to 3% by weight relative to the total weight of said coating.

16. A casing as defined in claim 14, wherein said wax includes functional groups and a main constituent comprising a mixture of esters of linear aliphatic alcohols with linear higher-molecular weight fatty acids having chain lengths ranging between about 18 and 34 carbon atoms.

17. A casing as defined in claim 16, wherein said wax comprises a chemically modified montan wax.

18. A sausage of the dry, long-keeping and uncooked type, comprising a foodstuff filling and a casing as defined by claim 1, said casing having a mold overlay on the outside and having been stored for at least two months for ripening and air drying.

19. A gas, water-vapor and smoke permeable tubular food casing, consisting essentially of:
   a cellulose casing; and a synthetic polymeric coating applied to the outside surface of said casing comprising a copolymer comprising hydrophilic vinylmonomers of the formula $CH_2=CR^1-X$, wherein $-R^1$ is $-H$ or $-CH_3$ and $-X$ is $-OCOR^2$ or $-CO_2R^2$, $-R^2$ being an alkyl group with 2 to 20 carbon atoms, and optionally an additional hydrophilic vinylmonomer of the formula $CH_2=CR^1-CO_2H$, said coating further comprising a wax in an amount from about 0.3 to 5% by weight relative to the total weight of said casing, said wax including functional groups and a main constituent comprising a mixture of esters of linear aliphatic alcohols with linear higher-molecular weight fatty acids having chain links ranging between about 18 and 34 carbon atoms, wherein said copolymeric outside coating has a weight per unit area from about 0.08 g/m² to less than 0.5 g/m².

20. A casing as defined in claim 19, wherein said wax comprises a chemically modified montan wax.

* * * * *